2,927,847
HEATING GASES AND VAPOURS

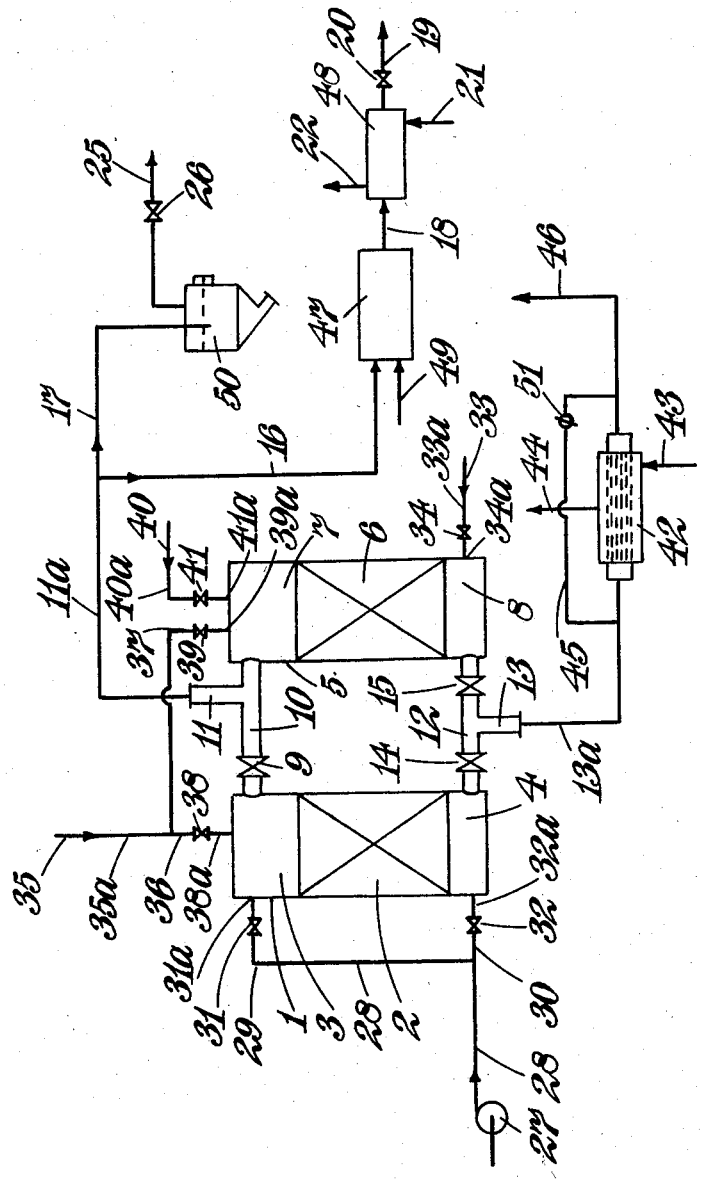

Michael Maccormac, London, and Austin George Carter, Stockton-on-Tees, England, assignors to The Gas Council, London, England, a corporation of Great Britain Application February 28, 1957, Serial No. 642,981

Claims priority, application Great Britain March 2, 1956

4 Claims. (Cl. 48—214)

This invention is for improvements in or relating to heating gases and vapours and has particular reference to a method for heating gases and vapours to a very high temperature and apparatus therefor.

The process of heating gases to high temperatures by passing them alternately with hot products of combustion through heat insulated vessels packed with heat storage material is well-known. Such vessels are called regenerators. In common practice these regenerators are used in pairs, one member of each pair being heated by the passage through it of hot products of combustion, while the other member is giving up its heat to the gas which is being heated. The products of combustion and the gas which is to be heated usually flow through the regenerator in opposite directions (the hot combustion products usually flowing downwards) so that the apparatus has some of the characteristics of a countercurrent heat exchanger.

When the gas is to be heated to a very high temperature, as for example where gaseous reactants are required at a very high temperature in order to carry out an endothermic reaction, the regenerators may be heated directly by burning gaseous or liquid fuel inside them with air which has itself been preheated in some external apparatus, or with air which has been enriched to some extent by the addition of oxygen.

It is the object of the present invention to enable gases and vapours to be heated to very high temperatures without the use of oxygen.

According to the present invention there is provided a two phase cyclic process for heating gases or vapours to a high temperature employing two separate beds or masses of heat storage material one of which is used to preheat air which is burned with liquid or gaseous fuel to raise the temperature of the second bed during the first phase, and during the second phase the second bed is used to heat the gas or vapour to the required high temperature whilst the first bed is being simultaneously reheated by combustion of fuel with air, the direction of flow or air through the first bed and of the gas or vapour through the second bed being in the opposite direction to that in which the products of combustion flowed through the beds while the beds were being heated.

After the first phase of the cycle there may be a short purge period during which gas or vapour is passed through the second bed as during the second phase of the cycle in order to displace the products of combustion into the first bed which is vented to the stack.

It is a feature of the present invention that the heat stored in the heat storage material in the first regenerator after the second phase of the cycle is sufficient for preheating the air passed through the regenerator during the first phase of the cycle to a temperature of at least 600° C.

It is a further feature of the present invention that since the first mass of heat storage material is heated only by combustion products from a flame burning fuel with unpreheated air the refractoriness of the materials used in this regenerator need not be so great as in the other. In addition an oxidising atmosphere can be maintained in this regenerator throughout both phases, which again permits the use of less refractory material. Furthermore the comparatively low temperature at which the first regenerator operates enables residual fuels to be used to heat it, whereas the very high temperatures attained in the second regenerator may make it necessary to use gaseous or distillate fuel so as to avoid slagging of the refractories with fuel ash.

The present invention also includes apparatus for carrying out the process described, one form of which apparatus comprises two regenerators, a conduit connecting the hot ends of the regenerators, a gas outlet in this conduit and a valve in this conduit between the first regenerator and the gas outlet, a conduit connecting the cold ends of the regenerators, a common gas outlet in this conduit connecting to a stack and valves in this conduit between each regenerator and the common gas outlet, valved connections for the supply of air to the hot end and cold end of the first regenerator, a valved connection for the supply of gas or vapour to the cold end of the second regenerator and valved connections for the supply of gaseous or liquid fuel to the hot end of each regenerator.

Another form of the apparatus comprises two regenerators, a conduit connecting the hot ends of the regenerators, a gas outlet in this conduit and a valve in this conduit between the first regenerator and the gas outlet, the cold end of each regenerator connected by conduit to a separate stack provided with a stack valve, valved connections for the supply of air to the hot end and cold end of the first regenerator, a valved connection for the supply of gas or vapour to the cold end of the second regenerator and valved connections for the supply of gaseous or liquid fuel to the hot end of each regenerator.

Where very high temperatures are required, the valve between the first regenerator and the gas or vapour outlet may be replaced by a refractory damper, and a second damper such as a butterfly valve is placed in the stack connection of the first regenerator and arranged to be controlled automatically so as to maintain the differential pressure across the first damper at approximately zero during the second phase of the cycle.

The regenerators contain heat storage refractory material capable of withstanding high temperatures, for examples, pebbles, checker brick, stacked tiles or specially shaped bodies. The bed of heat storage material may be uniformly of one kind and size of bodies or may consist of two or more layers of different kinds and/or different sizes of bodies having a refractoriness and resistance to thermal shock appropriate to their position in the bed of heat storage material.

Each regenerator, the conduit connecting the hot ends of the regenerators and the conduit for passing the hot gas or vapour are lined internally with insulating material faced with refractory material resistant to high temperatures. The conduit connecting the cold ends of the regenerators and the conduit for passing the hot products of combustion may also be lined with insulating material faced with refractory material.

During the cycle of operations certain valves are opened and closed in turn. These valves may be opened and closed by hand or automatically by mechanical, hydraulic or electrical means which may be actuated by an automatic timing device.

The products of combustion which pass from the cold ends of either or both regenerators to the stack may be sufficiently hot for the raising of steam in a waste heat boiler, in which case a waste heat boiler may be provided for cooling the products of combustion before they pass to the stack, steam being raised either as a by-product or for use in the process.

Alternatively if steam is the material which is to be heated to the high temperature in the second regenerator during the second phase of the cycle, the first regenerator may be designed so that the waste gases leaving this regenerator only are hot enough for steam raising. Thus the steam being produced by the waste gases from the first regenerator during the second phase is passed immediately into the second regenerator during the same phase.

The present invention may be of use wherever a gaseous reactant is required at a high temperature in order to carry out a reaction and is especially useful when the reaction is strongly endothermic or when the reaction products are of such a nature that it is impracticable to recover heat from them. Examples of such reactions are, the reaction between steam and carbonaceous material producing combustible gases, including synthesis gas, the reaction between carbon dioxide and carbon producing carbon monoxide and the reaction between carbon dioxide and hydrocarbons producing combustible gases, including synthesis gas. It may also be of use to heat gases or vapours, e.g. water gas or steam, which is then passed through retorts in which coal or similar material is carbonised.

The envisaged temperature of the heated gas or vapour is generally above 1200° C. and may exceed 1600° C.

The gas or vapour which is heated up in the second regenerator during the second phase of the cycle may pass to a reactor where the reaction, usually endothermic, takes place and the hot products of reaction pass to a cooler on the inlet or outlet of which there may be a cyclically operated valve. If necessary, during the first phase of the cycle this valve may be maintained closed so that the hot products of combustion are caused to pass through the second regenerator.

The present invention is particularly suitable for heating steam to a high temperature for the manufacture of oil gas in accordance with British patent specification No. 740,482. In this case the separate reactor referred to above may be unnecessary and in that case the space above the heat storage material in the second regenerator may be used for the endothermic reaction between the heated steam and petroleum oil during the second phase of the cycle. The hot oil gas is passed to a wash box where it is cooled with water or other cooling fluid and the cooled oil gas passes to the gas washing and purification plant.

The feeding of one of the reactants to this empty space at the hot end of the second regenerator during the second phase and the carrying out of an endothermic reaction between this reactant and highly heated gas or vapour in this empty space is not restricted to the fed reactant being petroleum oil and the highly heated reactant being steam. For example, the fed reactant could be a hydrocarbon gas, the highly heated reactant could be carbon dioxide and the product of the endothermic reaction a combustible gas.

In the same way that the first regenerator can be so designed that the waste gases leaving it are hot enough for steam raising as described above, so these waste gases may also be passed through a preheater or recuperator, for example a metal recuperator, in order to preheat the fed reactant before its admission to the reactor.

Following is a description by way of example of the mode of operation of the present invention in a plant in which steam is heated to approximately 1400° C., which plant consists of two regenerators A and B, connected together at the top by a conduit lined with insulating material faced with refractory material, this conduit having a valve between the first regenerator A and a branch conduit through which the steam leaves the plant. The branch conduit is similarly lined.

During the first phase of the cycle air is blown upwards through A in which it is preheated by heat stored there during the previous second phase; this air is passed to the top of B where it is combusted with liquid or gaseous fuel, the products of this combustion being passed downwards through B and out to the stack.

This is followed by a short purge during which steam is passed upwards through B in order to displace the products of combustion in B into a A. The valve in the connecting conduit is then closed and the second phase begins. The steam continues to be passed upwards through B where it is heated to the required high temperature and whence it passes to the reactor through the branch conduit. During this phase air is passed into the top of A where it is combusted with gaseous or liquid fuel, the products of combustion passing downwards through A and thence either to the stack or to a waste heat boiler.

When the plant is used for the production of gas from oil and steam by the process of British patent specification No. 740,482, the oil may be admitted either to a separate reaction chamber connected to the branch conduit or to the empty space at the hot end of regenerator B. In the latter case the separate reactor may either be dispensed with or it may be suitable utilised to complete the reaction between the oil and the highly heated steam. In either case the oil may be preheated, by utilising the heat in the waste gases leaving regenerator A, in a preheater.

Also part of the fuel combusted with the preheated air to heat up the second regencrator may be residual carbon left in that regenerator and in the ducts connected therewith from the hydrocarbon oil injected during the previous phase.

When a separate reactor is used and is fouled by carbon from the hydrocarbon oil, this carbon may be burnt off by preheated air delivered from the first regenerator during the first phase, the products being vented from the end of the reactor remote from the connections to the regenerators. The carbon may also be burnt off by the passage of unpreheated air into the reactor at the end remote from the connections to the regenerators, the products being passed into the second regenerator to provide some of the heat during the first phase. Alternatively, the carbon may be burnt off with preheated air during the first part of the first phase, and some of the heat thus evolved may be returned to the second regenerator by the passage of unpreheated air as above.

The invention is further described by way of example with reference to the accompanying drawing, which is in the form of a flow diagram.

The regenerator 1 contains a bed of heat storage material 2 above which there is an empty space 3 and below which an empty space 4. The regenerator 5 contains a bed of heat storage material 6 above which there is an empty space 7 and below which an empty space 8. The empty spaces 3 and 7 are known as the hot ends of the regenerators, while the empty spaces 4 and 8 are known as the cold ends of the regenerators.

The hot ends of the regenerators are connected by a conduit 10 which is provided with an outlet 11 connecting to a conduit 11a. Between regenerator 1 and the outlet 11 there is provided a hot gas valve 9. The cold ends of the regenerators are connected by a conduit 12 which is provided with an outlet 13 connecting to a conduit 13a and with valves 14 and 15 between each regenerator and the outlet 13.

Air blower 27 provides boosted air through the conduit 28 and then through conduit 29, valve 31 and connection 31a to the hot end of regenerator 1 or through conduit 30, valve 32 and connection 32a to the cold end of regenerator 1.

The gas or vapour to be heated to a high temperature enters at 33 into the conduit 33a and then passes through valve 34 and connection 34a to the cold end of the regenerator 5.

Gaseous or liquid fuel enters at 35 and passes through conduit 36, valve 38 and connection 38a to the hot end 3 of the regenerator 1 or through conduit 37, valve 39 and conection 39a to the hot end 7 of the regenerator 5. When liquid fuel is used the connections 38a and 39a terminate in spray nozzles projecting into the hot ends of the regenerators so that the liquid fuel is atomized.

For the production of oil gas in accordance with British patent specification No. 740,482 provision is made for petroleum oil to enter at 40 and pass through conduit 40a, valve 41 and connection 41a to the hot end of regenerator 5. The connection 41a terminates in a spray nozzle projecting into the hot end of the regenerator 5 so that the petroleum oil is atomized.

The petroleum oil itself can be used as a liquid fuel for heating up the regenerators in which case the petroleum oil supply conduit 40a can be omitted and the petroleum oil for both heating and gas making supplied through the fuel conduit 35a.

When the conduit 11a passes gas or vapour heated to a high temperature the hot gas or vapour passes through conduit 16 to a reactor 47 where the hot gas or vapour reacts with one or more other reactants entering the reactor at 49. The hot products of reaction pass through conduit 18 to a cooler 48, which is shown with the coolant entering at 21 and leaving at 22, and the cooled products of reaction pass through valve 20 and conduit 19.

When the conduit 11a passes hot oil gas which has been formed by reacting highly heated steam with petroleum oil in the empty space 7 at the hot end of the regenerator 5, the hot oil gas passes through conduit 17 to a wash box 50, and the oil gas passes through valve 26 and conduit 25.

The oil gas leaving the wash box is usually passed through a gas washing and purification plant which may be located between the wash box 50 and the valve 26.

The hot products of combustion passing through conduit 13a can pass through conduits 45 and 46 to a stack (not shown) or they can pass first through a waste heat boiler 42 before passing to the stack. Feed water enters the waste heat boiler at 43 and the steam which is raised by the cooling of the hot products of combustion leaves the boiler at 44. There may be incorporated in the conduit 45 a damper such as a butterfly valve 51.

When the vapour which is to be heated to a high temperature by the present process consists of steam, during the second phase of the cycle the steam which is raised in the waste heat boiler can be passed into the conduit 33a for passing through the regenerator 5.

The regenerators can be heated up from the cold in the following manner. With all control valves initially closed, the valve 14 is opened, the air blower 27 started up and the air control valve 31 opened. Air then enters the regenerator 1 through connection 31a, passes down this regenerator and through conduit 12, valve 14 and outlet 13 into conduit 13a and then passes to the stack.

The fuel control valve 38 is then opened and gaseous or liquid fuel allowed to enter the empty space 3 at the top of the regenerator 1 through connection 38a. The fuel is ignited by inserting an ignition poker (not shown in the diagram) into the empty space 3 near to the fuel inlet conection and the fuel combusted with air entering at connection 31a. Hot products of combustion then pass down regenerator 1 to the stack, heating up the heat storage material.

After a while fuel control valve 38, air control valve 31 and hot gas control valve 14 are closed and gas control valves 9 and 15, air control valve 32 and fuel control valve 39 are opened. Air enters the regenerator 1 through connection 32a, passes up the regenerator and becomes heated by the hot heat storage material in this regenerator. Preheated air passes through valve 9 and conduit 10 to the top of regenerator 5 and combusts with fuel in the empty space 7. A high flame temperature is reached and the hot products of combustion pass down regenerator 5, heating up the heat storage material, and then through conduit 12, valve 15 and conduit 13a to the stack.

When the heat storage material in regenerator 5 has become sufficiently heated up the plant is ready for commencing operation according to the process of the present invention.

Before commencing the second phase of the cycle fuel control valve 39, air control valve 32 and valve 15 are closed and valve 14 and gas or vapour control valve 34 are opened. Gas or vapour passes up the regenerator 5, becoming heated to a high temperature and driving out the products of combustion in the regenerator 5 which pass down regenerator 1 and then through valve 14 and conduit 13a, to the stack. This period of the cycle is a purge period and is of short duration.

At the commencement of the second phase of the cycle the outlet gas valve 20 is opened and hot gas valve 9 closed; air control valve 31 and fuel control valve 38 are opened. The highly heated gas or vapour will now pass from the top of the regenerator 5 through conduit 10 and outlet 11 into conduit 11a and then through conduit 16 to the reactor 47, from where the products of reaction will pass to cooler 48 and onwards. Fuel combusts with the air in the empty space 3 at the top of the regenerator 1 and hot products of combustion pass down regenerator 1, through valve 14 and conduit 13a to the stack, heating up the heat storage material.

At the commencement of the first phase of the cycle the gas or vapour control valve 34 and outlet gas valve 20 are closed and hot gas valve 9 opened; air control valve 31, fuel control valve 38 and hot gas valve 14 are closed and air control valve 31, fuel control valve 32 and hot gas valve 15 opened. Air enters the regenerator 1 through connection 32a, passes up the regenerator and becomes heated by the hot heat storage material in this regenerator. Preheated air passes through valve 9 and conduit 10 to the top of regenerator 5 and combusts with fuel in the empty space 7. A high flame temperature is reached and the hot products of combustion pass down regenerator 5, heating up the heat storage material, and then through conduit 12, valve 15 and conduit 13a to the stack.

When making oil gas according to British patent specification No. 740,482 steam is passed through regenerator 5 during the second phase of the cycle and at the commencement of this phase outlet gas valve 26, instead of valve 20, is opened and control valve 41 is opened to allow the petroleum oil to be sprayed into the empty space 7 at the top of regenerator 5, which oil reacts with highly heated steam to yield oil gas. The hot oil gas is passed through conduits 11a and 17 to wash box 50 where it meets a stream of water and the cooled oil gas passes onwards through valve 26.

If the petroleum oil is also used as fuel for heating the regenerators the petroleum oil supply conduit 40a can be omitted and at the commencement of the second phase of the cycle control valve 39 is opened instead of control valve 41.

The feeding of one of the reactants to the empty space 7 at the top of the regenerator 5 during the second phase of the cycle and carrying out an endothermic reaction between this reactant and highly heated gas or vapour in this empty space is not restricted to the fed reactant being petroleum oil and the highly heated reactant being steam. For example, the fed reactant may be a hydrocarbon gas, the highly heated reactant may be carbon dioxide and the product of the endothermic reaction a combustible gas.

The fuel burners may be retractable.

The amount of air preheat which can be used in this form of plant is limited by the hot gas valve 9. This valve may be water-cooled but, alternatively, it may be replaced by a refractory damper. If this is done it may be necessary to maintain the differential pressure across this damper as small as possible and this is achieved by means of a butterfly valve in the stack connection of regenerator 1. The butterfly valve is controlled automatically by hydraulic or other means by the differential pressure. This modification enables a greater proportion of the total fuel to be burnt in regenerator 1 thereby enabling the first phase to be shortened and the output of the plant increased.

We claim:

1. A cyclic process for heating gaseous and vaporous material to a high temperature employing two separate beds of heat storage material in a cycle having two major periods, which process comprises during the first major period of the cycle passing air through a first bed which has been heated during the second major period of the previous cycle to thereby preheat the air, combusting the preheated air with fluid fuel and passing the resulting hot products of combustion through the second bed to heat up the heat storage material there, and during the second major period of the cycle isolating said first bed from said second bed with respect to gas flow, combusting air with fluid fuel, passing the resulting hot products of combustion through said first bed in the opposite direction to that in which the air was passed during the first major period of the cycle to thereby heat up the heat storage material in the first bed, and at the same time passing the material to be heated through said second bed in the opposite direction to that in which the products of combustion were passed during the first major period of the cycle, said material being heated to the required temperature and withdrawn for use.

2. A process as claimed in claim 1, including the step of, after the first major period of the cycle and prior to isolation of the beds, passing said material for a short period through the second bed as during the second major period of the cycle in order to displace the products of combustion into the first bed and from thence to a discharge stack.

3. A cyclic process for heating gases or the like to a high temperature employing two separate beds of heat storage material in a cycle having two major periods, which process comprises during the first major period of the cycle passing air through a first bed which has been heated during the second major period of the previous cycle to thereby preheat the air, combusting the preheated air with fluid fuel and passing the resulting hot products of combustion through the second bed to heat up the heat storage material there; and during the second major period of the cycle isolating said first bed from said second bed with respect to gas flow, combusting air with fluid fuel, passing the resulting hot products of combustion through said first bed in the opposite direction to that in which the air was passed during the first major period of the cycle to thereby heat up the heat storage material in the first bed and, at the same time passing the gas to be heated through said second bed in the opposite direction to that in which the products of combustion were passed during the first major period of the cycle, said gas being heated to the required temperature and withdrawn for use, the heat stored in the heat storage material in the first bed after the combustion products have passed therethrough during said second major period being sufficient for preheating the air passed through the said heat storage material during the following major period of the cycle to a temperature of at least 600° C.

4. The process of claim 3 wherein said gas is passed through said second bed in the opposite direction as steam and petroleum oil is reacted endothermically with said steam above the heat storage material in said second bed during said second major portion.

References Cited in the file of this patent

UNITED STATES PATENTS

| | | |
|---|---|---|
| 2,605,176 | Pearson | July 29, 1952 |
| 2,665,979 | Taussig | Jan. 12, 1954 |
| 2,734,811 | Totzek et al. | Feb. 14, 1956 |